UNITED STATES PATENT OFFICE.

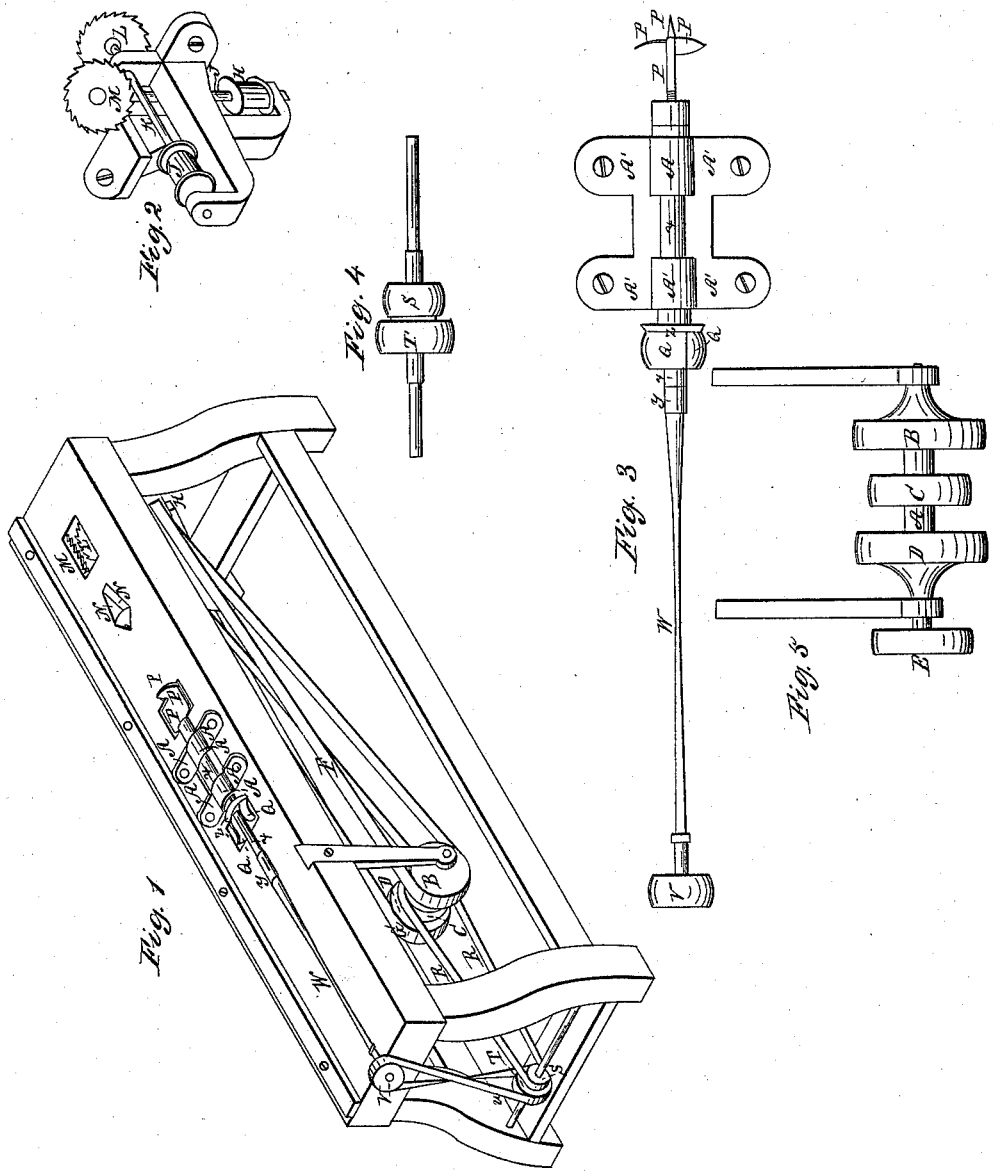

B. HOLLY AND JNO. W. WHEELER, OF SENECA FALLS, NEW YORK.

MACHINE FOR GROOVING LUMBER.

Specification of Letters Patent No. 8,206, dated July 8, 1851.

*To all whom it may concern:*

Be it known that we, BIRDSILL HOLLY and JOHN W. WHEELER, both of Seneca Falls, in the county of Seneca and State of New York, have invented certain new and useful Improvements in Machinery for Cutting Grooves in Wood, Metal, or Any Other Substance, and that the following is a full, clear, and exact description of the same, reference being had to the accompanying drawings, which are referred to in and form a part of such description.

The drawings are numbered from Figs. 1 to 5, both inclusive, and are lettered to correspond, where they show corresponding parts.

Figure 1 represents the whole machine when in working order. Fig. 2 represents the two circular saws with their driving pulleys. Fig. 3 represents the bit, the slicker or finishing tool the spring shaft, and the pulley that drives them. Figs. 4 and 5 are pulleys.

The saws, bit, slicker and spring shaft in Fig. 1 are drawn to a scale of three inches to the foot. The bit, slicker and spring shaft in Fig. 3 are drawn to a scale of six inches to the foot.

In Fig. 5 A is the driving shaft and E is the driving pulley communicating with the motive power. In Figs. 1 and 5 B, C and D are pulleys on the driving shaft A. The belt F (Fig. 1) runs from the pulley B (Figs. 1 and 5) to the pulley H (Figs. 1 and 2). The belt G (Fig. 1) runs from the pulley D, (Figs. 1 and 5) to the pulley I (Fig. 2.) The pulley H (Figs. 1 and 2) through the shaft J (Fig. 2) gives a rotary motion to the circular saw M (Figs. 1 and 2.) The pulley I (Fig. 2) through the shaft K (Fig. 2) gives a rotary motion to the circular saw L (Figs. 1 and 2.) The saws L and M are set upon the shafts K and J in such manner that every line drawn from the center of the surface of each saw to the circumference of the saw shall be at right angles to the axis of the shaft on which the saw is set. The shaft J is placed at right angles to the shaft K. The saws L and M project upward through a hole in the bed of the machine as seen in Fig. 1. The surfaces of the saws are at right angles to each other and as the saws revolve, if the material is pressed down against the bed of the machine and pushed against the saws, they will cut out from it a V-shaped strip. The distance which the saws shall project above the bed of the machine and of course the size of the strip cut out of the material need not be determined with any great degree of accuracy so long as the saws do not cut into the material so far as to mar the surface of the groove after it shall have been finished. The object of using these saws is to render the action of the bit more easy. The angle which the surfaces of the saws make with each other may of course be varied. The shaft J and the pulley H have one and the same axis and so have the shaft K and the pulley I.

N (Fig. 1) represents a hole through which the V-shaped strip, after it is cut, may pass away and thus not interfere with the action of the bit.

O (Fig. 1) represents a hood or guide of metal, smooth upon the inside, projecting toward the saws, and out above the bed as high as the saws for the purpose of guiding the strip down through the hole N as the material moves on toward the bit.

P (Figs. 1 and 3) is a double-lipped bit and Q (Figs. 1 and 3) is a slicker or finishing tool.

The belt R (Fig. 1) runs from the pulley C (Figs. 1 and 5) to the pulley S (Figs. 1 and 4.)

T is a pulley on the same shaft with the pulley S. The belt U (Fig. 1) runs from the pulley T (Figs. 1 and 4) to the pulley V (Figs. 1 and 3.) Thus a rotary motion is given to the pulley V. Through the pulley V runs the shaft W (Figs. 1 and 3.) The pulley V is set square on the shaft W. The slicker Q and the bit P are placed on the shaft X (Figs. 1 and 3) and revolve with it. The shaft W revolves with the pulley V.

The shafts W and X are coupled together firmly at Y in such manner that the rotation of the pulley V will cause the shafts W and X, the slicker Q and the bit P all to revolve together.

If the material, after it leaves the saws L and M is pushed forward against the bit P, as it revolves a groove with a curved surface will be cut in the material by the bit. The surface of the groove, as cut by the bit, will, however, not be sufficiently smooth for some purposes, and if the material be pushed still farther on against the slicker Q the surface of the groove will be smoothly finished. An auger or any other suitable instrument may be used instead of the bit P. The slicker Q is represented in the drawings as constructed with two cutters set somewhat spiralling inward toward the shaft X and springing from the circumference of the disk or plate Z (Figs. 1 and 3) but any suitable finishing tool may be used.

A¹ (Figs. 1 and 3) is a bed plate, the object of which is to hold the shaft X firmly down. The shaft X passes through elevations in the bed plate, and the bed plate is sunk down into the bed of the machine according to the depth of the groove to be cut. The bit P and the slicker Q project above the bed to a greater distance than any portion of the bed piece, the slicker projecting higher than the bit. The surface of the uncut portion of the material will thus slide freely along the bed of the machine until it reaches the pulley V. If the pulley V is so small than it can revolve within the groove cut, of course the material will pass freely over it, when the axis of the shaft W and the axis of the shaft X are in the same straight line. But if the pulley V be so large that it will not revolve freely without coming in contact with the material when the surface of the uncut portion of the material is against the bed of the machine, the shaft W may be sprung down so that the axis of the shaft W and the axis of the shaft X shall not be in the same straight line. The amount of the necessary springing of the shaft W and of course the angle that in such case the axes of the two shafts W and X will form with each other, will vary according to the size of the pulley V. The shaft W should be of sufficient length to permit it to spring down without injury. By this arrangement the size and power of the pulley V may be increased without its interfering with the forward movement of the material. This springing of the shaft W is shown in Fig. 1 where the center of the bit P is represented as being just as high as the bed of the machine, while the center of the pulley V is represented as being below the bed.

Fig. 1 represents the machine as we have constructed it for the purpose of cutting semicircular grooves in strips of wood to be used in making chain pumps.

Having thus fully described our improvements, what we claim to have invented and desire to secure by Letters Patent is—

The method herein described of forming grooves by circular saws and a deflecting throat in combination with suitable cutters, as set forth.

BIRDSILL HOLLY.
JOHN W. WHEELER.

Witnesses:
WASHBURN RAEE,
C. J. McKEE.